July 3, 1934.   N. H. WATTS   1,965,361
HANDLE STRUCTURE FOR VACUUM CLEANERS AND THE LIKE
Filed Oct. 17, 1933
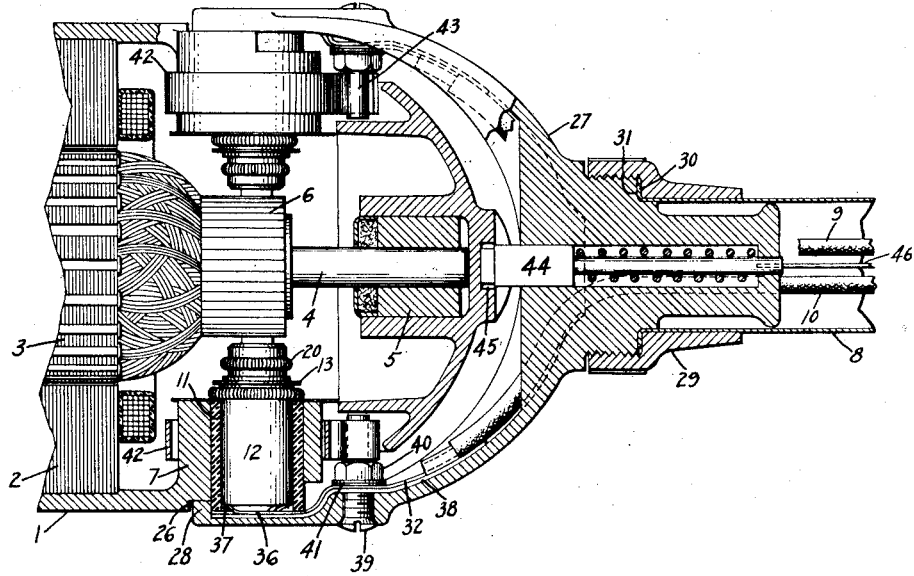
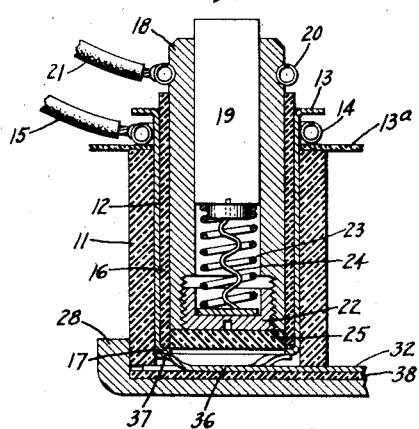
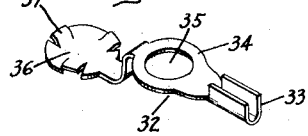
Inventor:
Noble H. Watts,
by Harry E. Dunham
His Attorney.

Patented July 3, 1934

1,965,361

UNITED STATES PATENT OFFICE 1,965,361

HANDLE STRUCTURE FOR VACUUM CLEANERS AND THE LIKE

Noble H. Watts, Bridgeport, Conn., assignor to General Electric Company, a corporation of New York Application October 17, 1933, Serial No. 693,968

5 Claims. (Cl. 172—36)

The present invention relates to electric motor-operated devices such as vacuum cleaners, floor polishing machines and the like wherein the device is moved over a surface by means of a pivoted handle and wherein the electric cord for connecting the motor of the device to a source of electrical energy extends through or along the handle, the handle being provided ordinarily at its outer end with a control switch for the motor located adjacent to the handle grip.

The object of the invention is to provide an improved construction and arrangement for pivoting a handle to a device of the character referred to and for connecting the electric cord to the motor, and for a consideration of what I believe to be novel and my invention, attention is directed to the accompanying description and the claims appended thereto.

In the drawing, Fig. 1 is a transverse sectional view of a structure embodying my invention; Fig. 2 is a sectional view through the motor brush holder construction, and Fig. 3 is a perspective view of a motor lead connector.

Referring to the drawing, 1 indicates the casing of a device such as a vacuum cleaner, a floor polisher, or the like. Mounted in casing 1 is an electric motor comprising a field structure 2 fixed to casing 1, an armature 3 having its shaft 4 mounted in suitable bearings, one of which is shown at 5, and a commutator 6. Casing 1 is provided with bosses 7 in which the motor brush holders and brushes are located. The handle, which is pivoted on casing 1, is indicated at 8. Only the lower portion of the handle is illustrated. It may be of any suitable length and may be provided with a grip at its outer end and also with an electric switch, as is well understood. The handle is tubular and extending through it is the electric cord or lead wire comprising conductors 9 and 10.

The structure so far described is to be taken as typical of any suitable structure of the type to which my invention is applicable.

My invention has to do particularly with the construction and arrangement for pivoting the handle to the casing and connecting the lead wires to the motor.

Located in each boss 7 is an outer sleeve 11 of insulating material such as hard fibre or the like, which is strong and wear resisting. In outer sleeve 11 is a metal sleeve 12 which at its inner end terminates beyond sleeve 11 and at its outer end terminates short of the outer end of sleeve 11. At its inner end sleeve 12 is provided with an outturned flange 13 and surrounding the sleeve between flange 13 and an adjacent disk 13ᵃ of insulating material is a garter spring connection 14 to which a motor lead 15 is fastened. Inside metal sleeve 12 is an inner sleeve 16 of suitable insulating material which at its inner end projects beyond the inner end of sleeve 12. At its outer end sleeve 12 is turned over the end of inner sleeve 16 to provide an annular contact flange 17. Contact flange 17 is located somewhat below the outer end of outer sleeve 11. Inside sleeve 16 is an inner metal sleeve or tube 18 in which the carbon brush 19 for the motor is located. At the inner end of sleeve 18 is a garter spring connector 20 to which a motor lead 21 is connected. Located between the end of brush 19 and a head 22 which threads into the outer end of sleeve 18 is a brush spring 23 and a connector 24. This serves to connect brush 19 to sleeve 18. On the outer end of head 22 is an insulating disk 25 located within the end of sleeve 16.

Casing 1 is cut away adjacent to the outer end of each of the sleeves 11 to provide annular recesses 26 surrounding the ends of tubes 11. Fastened to the inner end of handle 8 is a yoke 27, the two arms of which are provided at their ends with inwardly projecting annular flanges 28 which are located in recesses 26. Or viewed from another aspect the ends of the yoke arms are provided with flanged caps which fit over the outer ends of tubes 11. With this arrangement the handle yoke is pivotally mounted on the outer ends of sleeves 11. Yoke 27 is fastened to the tubular portion of the handle by a sleeve nut 29 which clamps a flange 30 on the end of such tubular handle portion against a shoulder 31 on yoke 27.

The lead wires 9 and 10 extend through openings in yoke 27 and along the inner surfaces of the yoke arms. At their ends, they are fastened to connectors 32, one of which is shown in perspective in Fig. 3. It comprises an end portion 33 adapted to be bent around the end of a lead wire, a central portion 34 having an opening 35 therein and a contact head 36. Contact head 36 has spring fingers 37 bent inwardly for engagement with the contact flange 17 on the outer end of sleeve 16. Contact head 36 fits within the flanged cap at the end of the yoke arm. Located between each connector 32 and its yoke arm is an insulating piece or strip 38 which serves to insulate the connector from the yoke arm. The connectors are fastened firmly to the yoke arms by screws 39 and nuts 40, which are insulated from the connectors by suitable washers and bushings 41.

To support in part at least the weight of the handle, there are provided springs 42 which surround bosses 7 with one end connected to the bosses and the other end connected to extensions 43 which form a part of screws 39. At 44 is a spring pressed latch adapted to engage notches 45 in casing 1 for holding the handle in certain adjusted positions. It may be moved by a wire 46 which extends through the handle and connects to a suitable operating finger (not shown).

With the above described arrangement, it will be seen that the yoke is pivotally connected to and in line with the motor brush holders and that the lead wires 9 and 10 are connected by connectors 32 to the connector sleeves 12, the spring fingers 37 engaging contact flange 17 and being adapted to turn thereon when the handle is turned. By this arrangement, the electrical connections between the lead wires 9 and 10 and the motor are slidable or pivotal connections so that turning of the handle does not affect the connection or place any wear upon them. And particularly turning the handle does not flex the connectors. The lead wires are housed in the yoke arms where they are adequately protected from injury.

The arrangement has the advantage also that in attaching the handle to the casing, there are no special motor electrical connections to be made as the positioning of the handle yoke automatically establishes the motor connections. This simplifies the assembling of the handle on the cleaner and its removal therefrom. At the same time, the structure is simple and readily constructed so as to be rugged and not likely to get out of order.

What I claim as new and desire to secure by Letters Patent of the United States:

1. In an electric motor driven machine, the combination of a casing, motor brush holders carried by the casing, and a handle pivotally mounted on the outer end of the brush holders.

2. In an electric motor driven machine, the combination of a casing, motor brush holders carried by the casing, and a handle pivotally mounted on the casing with the pivotal connection in line with the brush holders.

3. In an electric motor driven machine, the combination of a casing, motor brush holders carried by the casing, a handle pivotally mounted on the outer end of the brush holders, electrical conductors extending along the handle, and means carried by the handle connecting the conductors to the motor connections.

4. In an electric motor driven machine, the combination of a casing, a motor therein, brush holders each including an insulating sleeve and a conducting sleeve, a handle pivotally mounted on the insulating sleeve, connectors carried by the handle slidably engaging said conducting sleeves, and lead wires connected to said connectors.

5. In an electric motor driven machine, an electric motor having a casing, brush holders in the casing including a conducting sleeve, a handle pivoted on the casing with the pivotal connections in line with the brush holders, connectors carried by the handle having ends which yieldingly engage said conducting sleeves, and lead wires carried by the handle connected to said connectors.

NOBLE H. WATTS.